Feb. 7, 1967  R. P. HEUER  3,302,997
PREPARATION OF MAGNESIUM OXIDE FROM MAGNESITE
Filed July 31, 1964
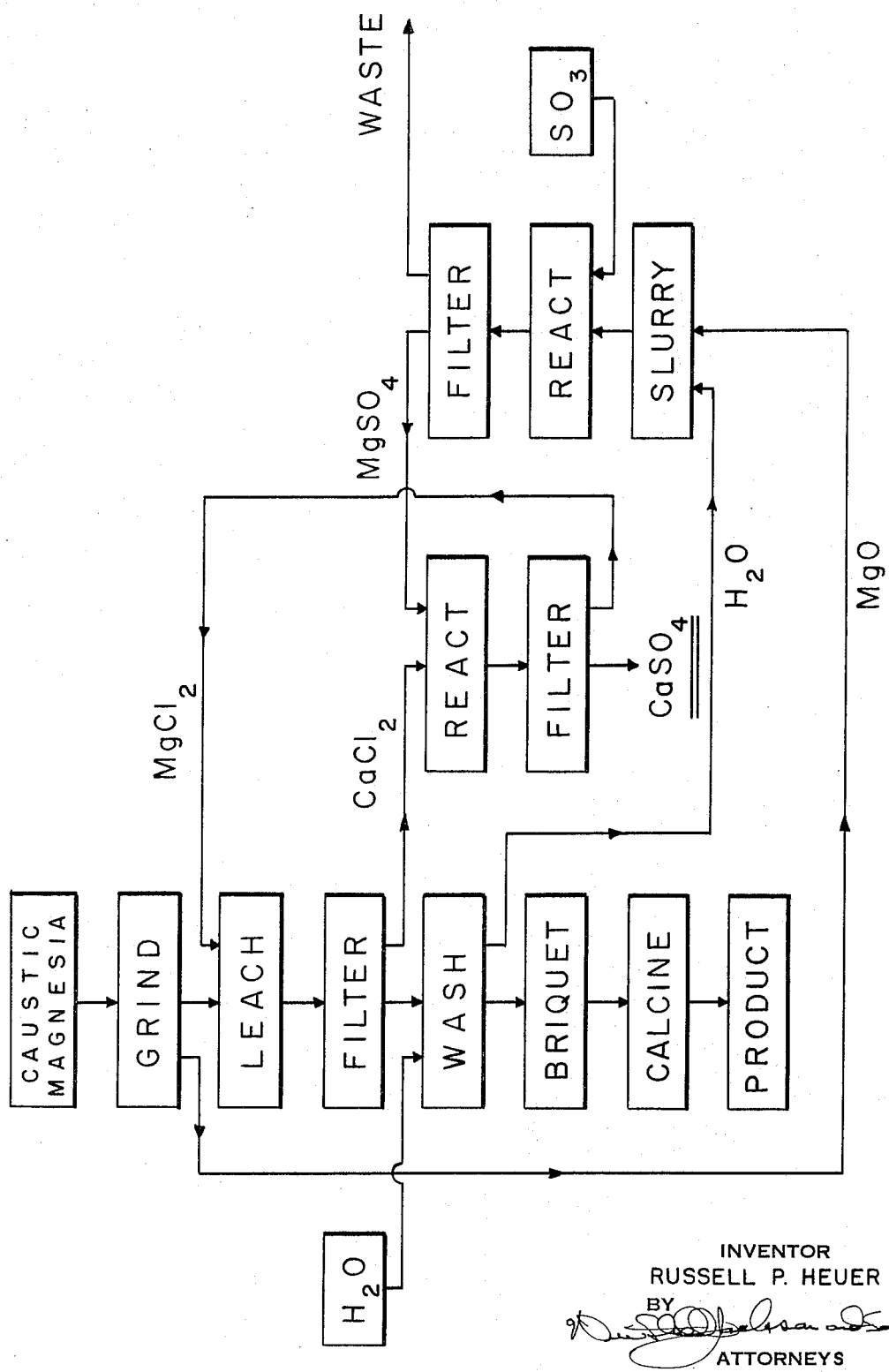
INVENTOR
RUSSELL P. HEUER
BY
ATTORNEYS

United States Patent Office 3,302,997
Patented Feb. 7, 1967

3,302,997
PREPARATION OF MAGNESIUM OXIDE
FROM MAGNESITE
Russell Pearce Heuer, Villanova, Pa., assignor to General Refractories Company, a corporation of Pennsylvania
Filed July 31, 1964, Ser. No. 386,544
2 Claims. (Cl. 23—201)

The present invention relates to the preparation of magnesium oxide (magnesia) of refractory grade from naturally occurring magnesium carbonate (magnesite).

The purpose of the invention is to remove lime from impure magnesite and densify the product so as to produce a refractory grade of magnesia which is suitable for making refractory brick for use in linings of furnaces such as open hearth furnaces, oxygen blowing converters, other metallurgical furnaces and the like.

A further purpose is to treat impure magnesium carbonate which contains more than 75% of magnesia and more than 3% of lime by weight on a fully calcined basis, by first calcining the magnesia at a temperature sufficient to form caustic calcined magnesia, for example, about 900° C. or higher, and then leaching the caustic calcined magnesia with a solution of magnesium chloride in water to remove the excess of lime as calcium chloride and to produce purified magnesia which contains less than 3% of lime by weight when determined on a fully calcined basis, that is free from loss on ignition.

A further purpose is to treat the leaching solution thus obtained, containing calcium chloride, with magnesium sulphate in water solution to react and preciptiate insoluble calcium sulphate from the leaching solution and thus regenerate the magnesium chloride, which is used to leach more caustic calcined magnesia.

A further purpose is to leach the caustic calcined magnesia as above set forth, thus producing a minimum of magnesium hydroxide, to separate the leached insoluble product comprising principally magnesia from the leaching solution, to mold this magnesia into briquettes using a suitable pressure of the order of at least 500 p.s.i., and calcine the briquettes at a temperature in excess of 1600° C., while retaining the magnesia in solid form to produce a dense magnesia which is suitable for use in making magnesia refractory brick and which has a bulk specific gravity in excess of 3.0.

The drawing shows a flow chart useful in explaining the invention.

Natural deposits of high purity magnesite suitable for making refractory brick are relatively rare and the cost of such magnesite is increasingly high. Specifically natural magneisum carbonate which contains less than 5% of calcium carbonate or less than 3% of lime on a fully calcined basis so that the calcinate is suitable for making refractory brick in which magnesia is a major component, does not occur frequently. On the other hand, deposits of magnesite which would otherwise be suitable except for the presence of excessive amounts of lime are relatively widespread. Some magnesites which contain excess amounts of lime can be beneficiated to lower the lime content by one of the treatments common in ore dressing such as heavy medium separation, fioatation, and the like. Other magnesites which contain excessive amounts of lime cannot be separated from the lime by physical means.

The following analysis, which illustrates the composition of a typical magnesite, will serve as an example of many others which contain an excessive amount of lime. The analysis is in percent by weight on a fully calcined basis and free from loss on ignition.

| | Percent |
|---|---|
| $SiO_2$ | 1.16 |
| $Fe_2O_3$ | 0.24 |
| $Al_2O_3$ | 0.14 |
| CaO | 7.16 |
| MgO (by diff.) | 91.30 |

I have discovered that impure magnesites of this type can be purified to remove the lime by chemical treatment at moderate cost.

In the procedure according to the invention, the magnesite is first calcined at a temperature sufficient to produce caustic calcined magnesia, for example, about 900° C. or higher. In the preferred embodiment this caustic calcined magnesia is then ground, to facilitate the chemical reaction.

The caustic calcined magnesia is then leached with a water solution of magnesium chloride. The concentration of the magnesium chloride is not critical but it will preferably be of a concentration of between 0.1% and 10%. The leaching can be accomplished at room temperature or elevated temperature as preferred.

The lime readily reacts with the magnesium chloride to form calcium chloride, while the magnesium oxide remains relatively inert, very little magnesium hydroxide being formed.

The magnesia therefore remains as an insoluble product in the leaching solution and can be separated from the solution by physical methods such as filtration, settling and the like.

After removing the calcium chloride solution from the magnesia, the magnesia is in the preferred embodiment washed with water which is removed again by physical methods such as settling and filtration. The resulting product is a considerably purified magnesia, which is preferably briquetted at a pressure of the order of at least 500 p.s.i. and then calcined, preferably in a rotary or shaft kiln at a temperature in excess of 1600° C. The resulting product is dense and has a bulk specific gravity exceeding 3.0. A typical analysis obtained by carrying out the above process on a magnesia of the composition above referred to is as follows, the analysis being given in percent by weight on a fully calcined basis free from loss on ignition.

| | Percent |
|---|---|
| $SiO_2$ | 1.18 |
| $Fe_2O_3$ | 0.21 |
| $Al_2O_3$ | 0.14 |
| CaO | 0.68 |
| MgO (by diff.) | 97.79 |

I have found that surprisingly the magnesium chloride solution removes the lime to quite a low level while producing very little magnesium hydrate. This is a great advantage in the present invention, since the magnesia obtained in the present invention can be calcined more readily than magnesium hydrate. One of the great advantages of the present invention is that the calcined product is dense whereas in calcining magnesium hydrate difficulty is frequently obtained because the calcine is not dense.

As shown in the flow chart, the leaching solution can readily be regenerated, although if the amount of calcium chloride in the leaching solution is small, the leaching solution may be thrown away.

The flow chart shows withdrawing of magnesia to form a slurry with wash water, reacting this with sulphur trioxide or sulphate to produce magnesium sulphate solution, separating insoluble material such as silica by filtration, and then using the magnesium sulphate solution to react with calcium chloride solution from a previous leaching step. This precipitates calcium sulphate which is removed by filtration, producing regenerated magnesium chloride solution which is used for leaching further impure magnesia.

The calcium sulphate produced is in a very fine state of subdivision and has a high purity, rendering it suitable for chemical purposes and also as a filler for plastics, rubber, and the like.

In view of my invention and disclosure variations and modifications to meet individual whim or particular need will doubtless become evident to others skilled in the art to obtain all or part of the benefits of my invention without copying the process shown, and I therefore claim all such insofar as they fall within the reasonable spirit and scope of my claims.

Having thus described my invention, what I claim as new and desire to secure by Letters Patent is:

1. A process of producing magnesium oxide of high density from impure magnesite which contains more than 75% of magnesium oxide and more than 3% of lime on a fully calcined basis, which comprises calcining said impure magnesite at a temperature of at least about 900° C. to produce caustic calcined magnesia, then leaching the caustic calcined magnesia with a water solution of magnesium chloride to remove the slaked lime as calcium chloride, retain the bulk of the magnesia in unslaked condition and obtain magnesia containing less than 3% of lime on a fully calcined basis, separating the magnesia from the leaching solution, molding the magnesia obtained from the leaching solution into briquettes under a pressure of at least 500 p.s.i., and calcining the briquettes at a temperature of at least about 1600° C. and thus producing a dense calcined magnesia product having a bulk specific gravity in excess of 3.0.

2. A process of claim 1, in which the water solution of magnesium chloride contains from 0.1 to 10% of magnesium chloride by weight.

References Cited by the Examiner
UNITED STATES PATENTS

| | | | |
|---|---|---|---|
| 539,889 | 5/1895 | D'Andria | 23—201 |
| 712,225 | 10/1902 | Wing | 23—201 X |
| 2,137,675 | 11/1938 | MacIntire | 23—201 X |
| 2,537,014 | 1/1951 | Austin | 23—201 |
| 3,111,385 | 11/1963 | Patton et al. | 23—201 |

OSCAR R. VERTIZ, *Primary Examiner.*

G. OZAKI, *Assistant Examiner.*